United States Patent [19]
Beazley et al.

[11] 3,763,046
[45] Oct. 2, 1973

[54] HYDRAULIC FLUIDS

[75] Inventors: Kenneth Michael Beazley; Margaret Climpson, both of Cornwall, England

[73] Assignee: English Clays Lovering Pochin & Company Limited, Cornwall, England

[22] Filed: Feb. 2, 1971

[21] Appl. No.: 111,890

[30] Foreign Application Priority Data
Feb. 10, 1970 Great Britain..................... 6,387/70

[52] U.S. Cl..................... 252/75, 210/350, 252/74, 252/76
[51] Int. Cl............................................. C09k 3/00
[58] Field of Search.......................... 252/71, 73–76, 252/25, 49.3, 8.55 D; 188/322, 269; 210/350

[56] References Cited
UNITED STATES PATENTS

| | | | |
|---|---|---|---|
| 3,238,141 | 3/1966 | Gatza | 252/75 X |
| 1,822,449 | 9/1931 | Nonamaker | 252/74 |
| 2,455,117 | 11/1948 | Glavis et al. | 252/76 X |
| 2,558,030 | 6/1951 | Zisman et al. | 252/75 X |
| 2,665,312 | 1/1954 | Ohlmann et al. | 252/73 X |
| 2,898,294 | 8/1959 | Priest et al. | 252/8.55 R |
| 2,552,775 | 5/1951 | Fischer et al. | 252/8.5 C |
| 3,554,287 | 1/1971 | Eilers | 252/8.55 R X |

OTHER PUBLICATIONS

Gregory, Uses and Applications of Chemicals and Related Materials, Reinhold Pub. Corp., New York, 1939, pp. 5, 6.

Primary Examiner—Leon D. Rosdol
Assistant Examiner—Harris A. Pitlick
Attorney—Larson, Taylor & Hinds

[57] ABSTRACT

A hydraulic fluid suitable for use in a tube pressure filter, the hydraulic fluid comprising an aqueous solution of an inorganic salt and an organic material.

12 Claims, 1 Drawing Figure

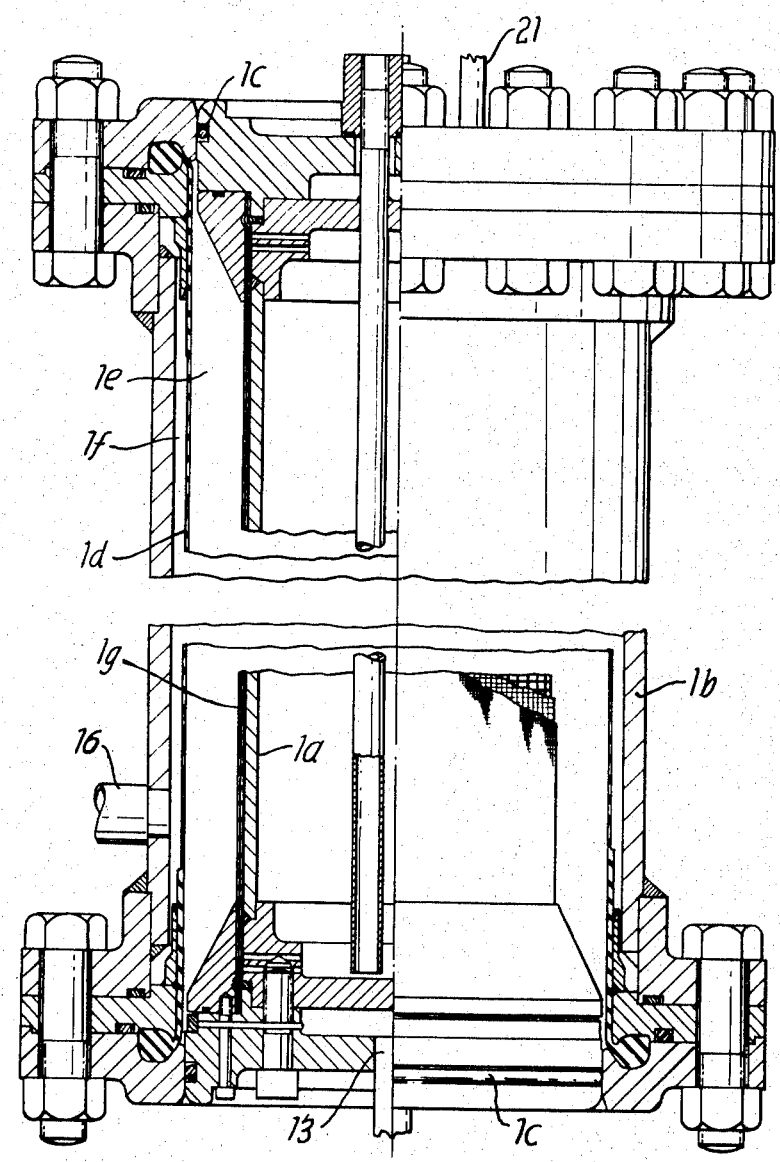

HYDRAULIC FLUIDS

This invention relates to hydraulic fluids and more particularly is concerned with hydraulic fluids having a high specific gravity.

There exists a need for high-density hydraulic fluids in several types of industry. For example, in tube pressure filters which are to be used for reducing the liquid content of wet, particulate solid materials in the form of high density slurries it is important to use a hydraulic fluid of an appropriate density. Various kinds of tube pressure filters have been described; see, for example, U.K. Pat. NO.907,485 and Belgian Pat. No.717,264. One kind of tube pressure filter essentially comprises a pair of generally coaxial tubular bodies forming between them an annular chamber; an impermeable elastic sleeve which is secured to the outer of the pair of tubular bodies and divides said chamber into generally coaxial and non-communicating inner and outer compartments, the inner compartment including an inlet, for a wet particulate solid material to be pressure filtered, and a filter element which is supported by the inner of the pair of tubular bodies, the inner tubular body and the filter element being constructed and arranged so as to permit liquid to flow through the filter element and the inner tubular body while preventing the flow therethrough of the particulate solid material, and the outer compartment including an inlet for a hydraulic fluid under pressure whereby the impermeable elastic sleeve can be urged against a wet particulate solid material in the inner compartment to compress the same and remove liquid therefrom; and means for displacing the tubular bodies axially relative to one another to a position whereat the particulate solid material can be discharged from the inner compartment. Hitherto, materials which could be used as high density hydraulic fluids have possessed a number of disadvantages, probably the most important of which has been their abrasive character.

It is an object of the present invention to provide a high density hydraulic fluid which can be used in a tube pressure filter of the type hereinbefore described and which is non-abrasive in character.

Accordingly, the present invention provides a hydraulic fluid comprising, in aqueous solution, one or more inorganic salts which have a density of at least 3 grams per cubic centimetre and a solubility of at least 100 grams per litre in water at 0°C, and a water-soluble organic material which, on dissolution in water, produces a solution having a viscosity greater than that of water, such that the resulting solution has a specific gravity greater than 1.350, and a viscosity in the range from 0.2 to 2.0 poise at 20°C, and can withstand a pressure of at least 500 p.s.i. without decomposing.

Preferably, a hydraulic fluid according to the present invention is non-corrosive, non-toxic, non-flammable, and capable of withstanding a pressure of 5000 p.s.i. without decomposing. It is also advantageous for the hydraulic fluid to have a low freezing point and a low first eutectic point.

The water-soluble organic material employed in the invention will generally be a water-soluble organic polymer, which may be in the form of a viscous liquid.

The most suitable inorganic salts are the bromides and iodides of sodium and potassium, but other useful salts include the halides of other metals, for example the halides, generally the bromides and iodides, of the other alkali metals, and of the alkaline earth and transition-metals.

The water-soluble organic material can advantageously be a polyglycol, for example a polyethylene glycol, such as that manufactured under the registered trade mark "CARBOWAX" 6000, or a polyethylene oxide. Alternatively a polyacrylate or a polyacrylamide can be used, in which case the pH of the hydraulic fluid should be 7 or slightly above. The molecular weight of the polyglycol or polyethylene oxide is preferably at least 5000 and that of the polyacrylate or polyacrylamide is preferably at least 100,000.

Generally, the hydraulic fluid will comprise 5–50 parts by weight of a water-soluble organic material, for example polyethylene glycol, 50–200 parts by weight of water, and 15–150 parts by weight of an inorganic salt (calculated on an anhydrous basis). If an iodide is used in the hydraulic fluid, it is advantageous to add a small quantity of an aqueous thiosulphate solution, generally from 0.01 to 0.5 parts by weight of N/10 solution of sodium thiosulphate. If a relatively large quantity of the water-soluble organic material, e.g. a viscous organic liquid, is used, it is advantageous to incorporate an organic cosolvent, for example 5–20 parts by weight of acetone, since this can assist in the dissolution of the water-soluble organic material and can act as a lubricant.

For a better understanding of the invention, and to show how the same can be carried into effect, reference will now be made, by way of example, to the accompanying drawing, which shows a diagrammatic partial cross-section of a tube pressure filter of the kind described in Belgian Pat. No.717,264, and to the following Examples.

Referring to the drawing, the tube pressure filter 1 comprises an inner tubular member 1a, an outer tubular member 1b, sealing means 1c at each end of the inner tubular member 1a, an impermeable elastic sleeve 1d secured to the outer tubular member 1a to define with the tubular members inner and outer non-communicating compartments 1e and 1f, an inlet 13 to the inner compartment 1e for slurry to be pressure filtered, a filter element 1g supported by the inner tubular member 1a, an inlet 16 to the outer compartment 1f for hydraulic fluid under pressure, and an inlet 21 for compressed air for use in discharging the filter cake. In use, it is preferable for the specific gravities of the hydraulic fluid and of the material being pressure filtered to be as nearly equal as possible; the difference in specific gravities is preferably not greater than 0.05. The invention will now be illustrated by the following Examples:

EXAMPLE 1

A hydraulic fluid was prepared by mixing together the following ingredients (all in parts by weight) until a homogeneous solution resulted:

Potassium iodide 100

Polyethylene glycol 29

Acetone 8

N/10 sodium thiosulphate solution 0.2

Water 108

The polyethylene glycol had a molecular weight greater than 5,000. The resulting solution was found to have a specific gravity of 1.450 under normal temperature and pressure. Its viscosity at 20°C. was within the range of from 0.2 – 2.0 poise. The hydraulic fluid was non-toxic, non-corrosive, and non-flammable. The hydraulic fluid was fed into the compartment 1f of the tube pressure filter described above and an aqueous slurry of chalk whiting having a solids content of 49.5 percent by weight, which is equivalent to a specific gravity of 1.443, was fed into the compartment 1e. The pressure of the hydraulic fluid was raised to 1000 psig and maintained at this level for 2½ minutes, during which time liquid was expressed from the slurry of chalk whiting and a filter cake was formed. The filter cake was then discharged and was found to be 2 cm. thick and to weight 76 lb.(34 kg). The total cycle time was 3 minutes, the water content of the filter cake was 18.5 percent by weight and the output rate was 1240 lb. per hour (562 Kg per hour). After continuous running for 7 days the apparatus was dismantled and examined and there was found to be no wear of the metal parts which were in contact with the hydraulic fluid and no deterioration of the impermeable elastic sleeve 1d which formed the wall between the compartments of the tube pressure filter.

EXAMPLE 2

A hydraulic fluid was prepared by mixing together the following ingredients (all in parts by weight) until a homogeneous solution resulted:

Potassium iodide 100

Polyethylene glycol 29

Acetone 8

N/10 Sodium thiosulphate solution 0.2

Water 88

The polyethylene glycol had a molecular weight greater than 5,000. The resulting solution was found to have a specific gravity of 1.510 under normal temperature and pressure and had a viscosity of 0.40 poise at 20°C. It was non-toxic, non-corrosive, non-flammable and withstood a compression of 500 p.s.i. without decomposition.

EXAMPLE 3

A hydraulic fluid was prepared by mixing together the following ingredients (all in parts by weight) under a homogeneous solution resulted:

Sodium bromide 100

CARBOWAX 6000 19

Water 126

This solution was found to have a specific gravity of 1.470 under normal temperature and pressure and had a viscosity of 0.38 poise at 20°C. It was non-toxic, non-corrosive, non-flammable and withstood a pressure of 500 p.s.i. without decomposition.

The hydraulic fluids described in Examples 2 and 3 above have been successfully employed in a tube pressure filter of the type hereinbefore described.

We claim:

1. A hydraulic fluid consisting essentially of an aqueous solution containing from 50 to 200 parts by weight of water, from 15 to 150 parts by weight, of at least one inorganic halide which has a density of at least 3 grams per cubic centimeter and a solubility of at least 100 grams per litre in water at 0°C, and from 5 to 50 parts by weight of a water-soluble organic material which is selected from the group consisting of polyglycols and polyethylene oxides having a molecular weight of at least 5,000 and of salts of polyacrylic acids and polyacrylamides having a molecular weight of at least 100,000 and which organic material, on dissolution in water, produces a solution having a viscosity higher than that of water, wherein the aqueous solution has a specific gravity greater than 1.350, a viscosity in the range from 0.2 to 2.0 poise at 20°C, and can withstand a pressure of at least 500 p.s.i. without decomposing.

2. A hydraulic fluid as claimed in claim 1 in which the inorganic halide is an iodide and in which the hydraulic fluid contains from 0.01 to 0.5 parts by weight of an N/10 aqueous solution of sodium thiosulphate.

3. A hydraulic fluid as claimed in claim 1 in which the hydraulic fluid contains from 5 to 20 parts by weight of acetone to assist the dissolution of said water-soluble material.

4. A hydraulic fluid as claimed in claim 1, in which the inorganic halide is a halide of an alkali metal.

5. A hydraulic fluid as claimed in claim 1 in which the inorganic halide is a halide of an alkaline earth metal.

6. A hydraulic fluid as claimed in claim 1 in which the inorganic halide is a halide of a transition metal.

7. A hydraulic fluid as claimed in claim 4 in which the alkali metal is sodium.

8. A hydraulic fluid as claimed in claim 4 in which the alkali metal is potassium.

9. A hydraulic fluid as claimed in claim 1 in which the inorganic halide is a bromide.

10. A hydraulic fluid as claimed in claim 1 in which the inorganic halide is an iodide.

11. A hydraulic fluid as claimed in claim 1 in which said water-soluble organic material comprises a polyethylene glycol.

12. A hydraulic fluid as claimed in claim 1, in which said water-soluble organic material is a salt of a polyacrylic acid and in which the pH of the aqueous solution is at least 7.

* * * * *